United States Patent
Mogi (10) Patent No.: US 7,602,554 B2
(45) Date of Patent: Oct. 13, 2009

(54) OPTICAL SCANNING APPARATUS

(75) Inventor: Shin Mogi, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1 day.

(21) Appl. No.: 11/957,778

(22) Filed: Dec. 17, 2007

(65) Prior Publication Data
US 2008/0158633 A1 Jul. 3, 2008

(30) Foreign Application Priority Data

Dec. 28, 2006 (JP) .............................. 2006-355158
Nov. 8, 2007 (JP) .............................. 2007-291332

(51) Int. Cl.
*G02B 27/30* (2006.01)
*G02B 3/00* (2006.01)
(52) U.S. Cl. ...................... 359/641; 359/642
(58) Field of Classification Search .................. 359/204, 359/233, 238, 242–248, 641, 642, 206
See application file for complete search history.

(56) References Cited

U.S. PATENT DOCUMENTS

| 4,386,827 A | * | 6/1983 | Scifres et al. ............... 359/315 |
| 4,480,899 A | * | 11/1984 | Sprague ...................... 359/263 |
| 7,265,885 B2 | * | 9/2007 | Susumu ...................... 359/204 |
| 7,468,840 B2 | * | 12/2008 | Cohen et al. ................. 359/495 |

FOREIGN PATENT DOCUMENTS

| JP | 2-93559 A | 4/1990 |
| JP | 2-293877 A | 12/1990 |
| JP | 4-264420 A | 9/1992 |

* cited by examiner

*Primary Examiner*—Mohammed Hasan
(74) *Attorney, Agent, or Firm*—Rossi, Kimms & McDowell, LLP (57) ABSTRACT

A compact optical scanning apparatus which can change the focal position of a light beam at high speed is provided. In this optical scanning apparatus, a collimating lens (5) which parallelizes a light beam from a light source (1) is formed by a KTN crystal, and electrodes (7, 6, 8) are placed inside and outside the collimating lens (5).

12 Claims, 8 Drawing Sheets

OPTICAL SCANNING APPARATUS

BACKGROUND OF THE INVENTION

1. Field of the Invention

The present invention relates to an optical scanning apparatus and, more particularly, to an optical scanning apparatus which is used for a recording engine unit in a laser printer or the like to form an image by scanning a photosensitive member with a light beam.

2. Description of the Related Art

An optical scanning apparatus in an electrophotographic image forming apparatus drives a semiconductor laser in accordance with input image data and forms an electrostatic latent image corresponding to the image data on a photosensitive member.

A collimating lens converts laser light emitted from a semiconductor laser used as a light source for an optical scanning apparatus into almost parallel light, and a deflecting member such as a rotating polygon mirror deflects the light with a predetermined beam diameter. The light is then subjected to the focusing effect of an f-θ lens. At the same time, the f-θ lens corrects the distortion of the light so as to guarantee the temporal linearity of scanning. As a consequence, the laser light passing through the f-θ lens is imaged/scanned on the photosensitive member at a constant speed in the main scanning direction (the axial direction of the photosensitive member). Since the shift of a focal position on the photosensitive member is a factor that causes a deterioration in image quality, the optical scanning apparatus is designed to prevent the focal position of laser light on the photosensitive member from greatly shifting. For example, the dimensional accuracy and positioning accuracy of optical and mechanical components are improved, and the linear expansion coefficients of the components are optimized.

There is proposed a technique for changing the focal position of laser light on a photosensitive member by mechanically moving a collimating lens (see Japanese Patent Laid-Open No. 2-293877). There is also proposed a technique for changing the convergence of laser light by placing an electro-optics crystal as a focus correction unit on the exit side of laser light from a collimating lens (see Japanese Patent Laid-Open No. 4-264420).

In addition, there is disclosed a technique for detecting the focus shift of a light beam using a photosensor, also detecting a change in environmental element which is a cause of the focus shift, and correcting the focus shift on the basis of the detected focus shift and the detected change in environmental element (see Japanese Patent Laid-Open No. 2-93559).

The method proposed in Japanese Patent Laid-Open No. 2-293877 requires a complicated mechanism for mechanically moving the collimating lens. In addition, the response speed is low because of mechanical movement, and hence it is difficult to change the focal position of a light beam at high speed. For this reason, it is hard to say that this method can be suitably applied to a high-speed device such as a laser printer.

The method proposed in Japanese Patent Laid-Open No. 4-264420 does not require any mechanical movable portion in the optical system, and performs electrical control with an electro-optics crystal. This allows operation with high response speed. This method, however, requires new components such as an electro-optics crystal in addition to the collimating lens. As a result, the number of required components increases, and the optical scanning apparatus increases in size.

Furthermore, the focal position of laser light greatly depends on the positioning accuracy of optical components. The expansion and contraction of components due to thermal expansion will cause shifts between the actual positions of optical components and the mathematically calculated positions. These causes make it difficult to improve the accuracy of the focal position of laser light in an entire scanning range in the main scanning direction.

SUMMARY OF THE INVENTION

The present invention has been made in consideration of the above prior art, and has as its object to provide a compact optical scanning apparatus which can change the focal position of a light beam at high speed with a small number of components.

In order to achieve the above object, an optical scanning apparatus of the present invention has the following arrangement. There is provided an optical scanning apparatus comprising a collimating lens which parallelizes a light beam from a light source, in which the collimating lens is formed by an electro-optics crystal, and is configured to change a focal length by applying an electrical signal to the electro-optics crystal through electrodes placed inside the collimating lens and on side surfaces thereof.

According to the present invention, it is possible to quickly change the focusing characteristic of a light beam transmitted through the collimating lens or the cylindrical lens formed by an electro-optics crystal between the respective electrodes placed inside and outside the lens by applying a voltage to each electrode. This makes it possible to quickly displace the focal position of a light beam to be deflected/scanned, thereby improving the accuracy of the focal position of a light beam in the entire scanning range. As a result, the write quality on the surface of the photosensitive member to be scanned or the like can be improved.

In addition, since the collimating lens itself is formed by an electro-optics crystal, there is no need to add any new components as in the prior art. This can decrease the number of components required and reduce the size and cost of the apparatus.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

The preferred embodiments of the present invention will be exemplarily described in detail below with reference to the accompanying drawings. Note, however, that the constituent elements described in the embodiments are merely examples, and the range of the present invention is not limited to only them.

<Schematic Arrangement>

Figure 1:
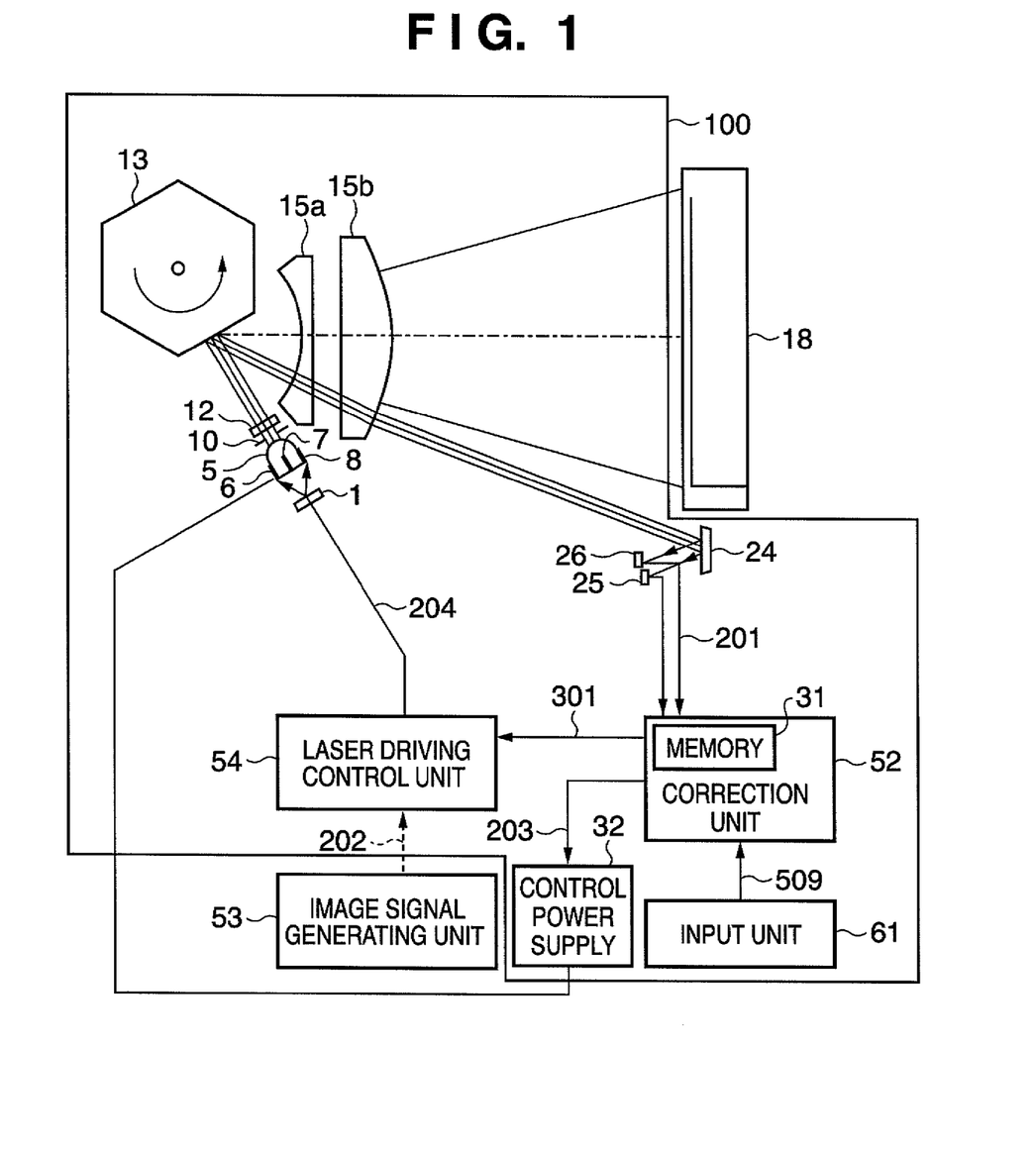
FIG. 1 is a view for explaining an optical scanning apparatus according to the first embodiment of the present invention.

FIG. 1 is a view showing a schematic arrangement of an optical scanning apparatus 100 according to an embodiment of the present invention. The optical scanning apparatus 100 is incorporated in, for example, an electrophotographic printer or a copying machine, and is used to optically draw an image corresponding to image data on a photosensitive member such as a target by scanning a light beam on it. This apparatus may have other applications. For example, the apparatus may include a mechanism for changing a light beam in the sub scanning direction to be used as a display apparatus.

Figure 2:
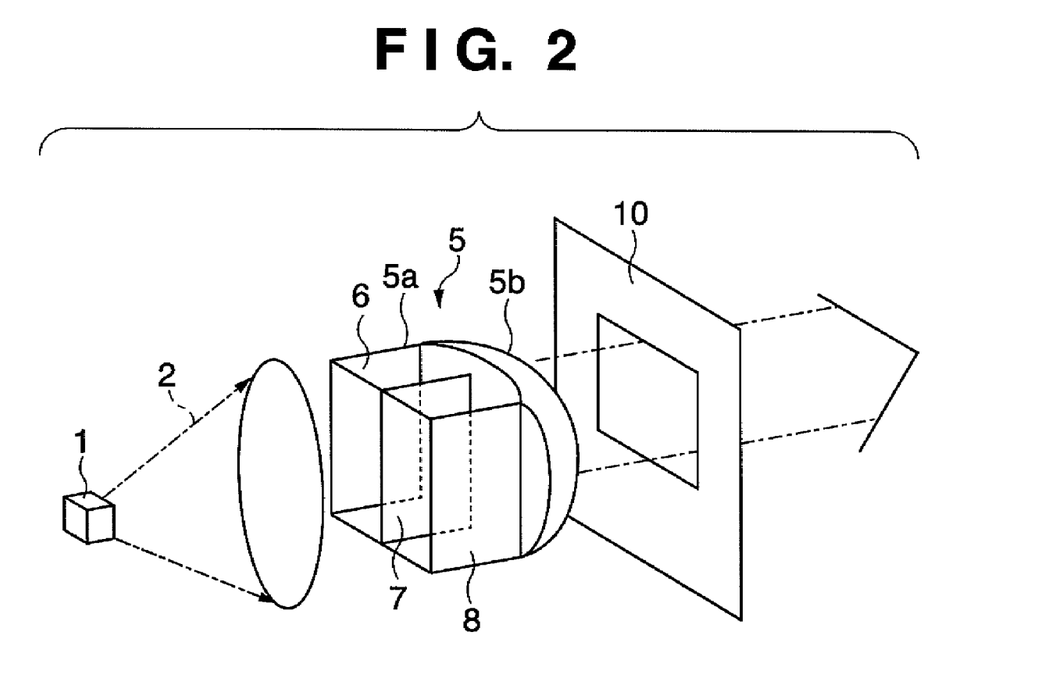
FIG. 2 is a perspective view for explaining a collimating lens formed by a KTN crystal.
Figure 3:
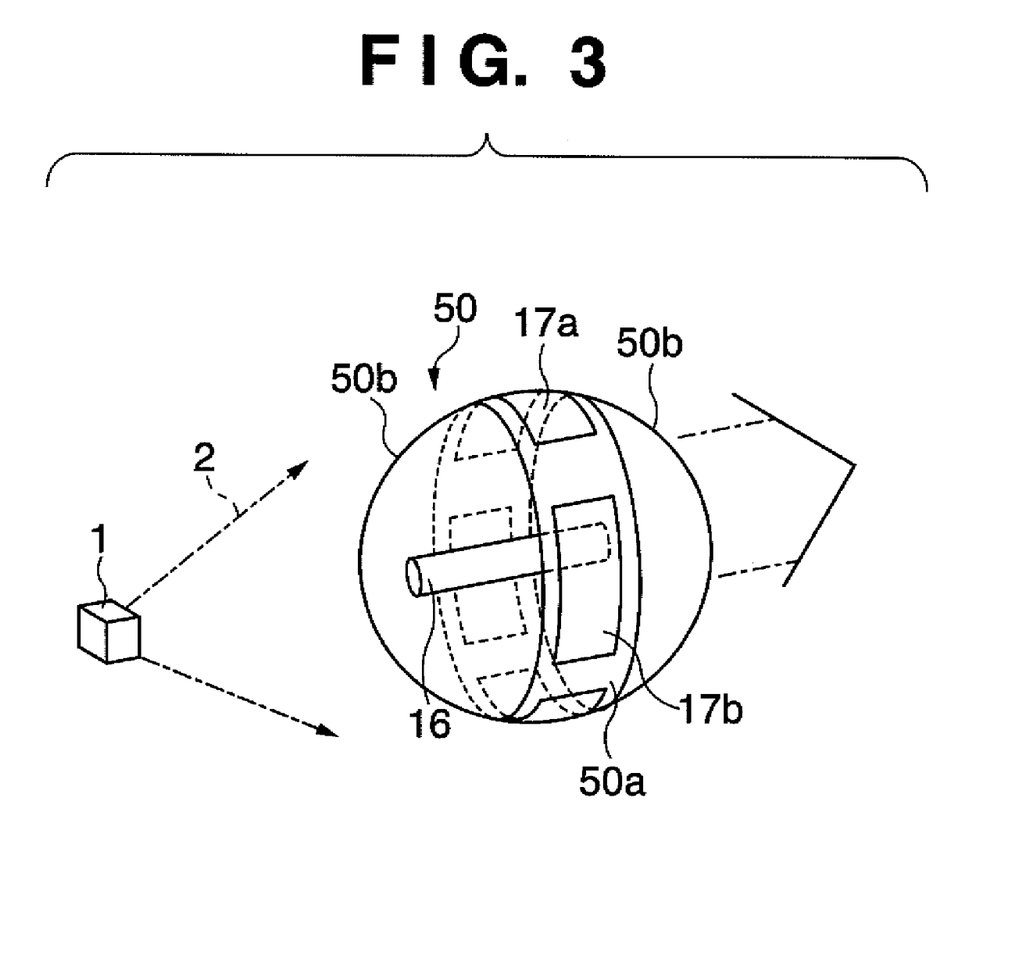
FIG. 3 is a perspective view for explaining a collimating lens in another shape which is formed by a KTN crystal.

FIG. 2 is a perspective view showing an example of a collimating lens formed by an electro-optics crystal such as a KTN crystal. KTN is potassium tantalate niobate represented by $KTaNbO_3$ ($KTa_{1-x}Nb_xO_3$ in general). Likewise, FIG. 3 is a perspective view showing a collimating lens in another shape which is formed by an electro-optics crystal.

The optical scanning apparatus 100 mainly includes a semiconductor laser 1 as a laser light source, a collimating lens 5, an optical aperture 10, a cylindrical lens 12, a deflector 13 such as a polygon mirror, and scanning lenses 15a and 15b which are sequentially arranged, and is configured to scan on the surface of a photosensitive member 18. This apparatus also includes a return mirror 24 at a position which is shifted from the photosensitive member 18 and at which the mirror is scanned with laser light. The apparatus also includes a BD sensor 25 which detects reflected light from the mirror and a beam convergence sensor 26. It suffices if the BD sensor 25 can detect laser light itself. In contrast to this, the beam convergence sensor 26 is configured to be capable of measuring the spot diameter of laser light. Measuring a spot diameter while changing the focal length of the collimating lens 5, i.e., the convergence of a light beam, will detect the convergence of the light beam.

The arrangement of the apparatus will be described next along with the optical path of a laser beam (more generally a light beam). The collimating lens 5 parallelizes a light beam 2 from the semiconductor laser 1. The optical aperture 10 shapes the light beam. The resultant light beam reaches the cylindrical lens 12. The deflector 13 is a rotating polygon mirror provided near the beam waist of the light beam focused and output from the cylindrical lens 12. As the polygon mirror is rotated/driven, this light beam is deflected and scanned in the main scanning direction. It suffices to use a vibrating mirror which vibrates around the axis within a predetermined angle range or an optical system for performing linear scanning with a light beam, instead of the polygon mirror, as the deflector 13.

The scanning lenses 15a and 15b are configured to have different focal lengths in the main scanning direction and the sub scanning direction, and are used to form the light beam deflected by the deflector 13 into an image on the surface of the photosensitive member 18. The scanning lenses 15a and 15b are arranged such that the reflecting surface of the deflector 13 geometrically-optically have an almost conjugate relationship in the sub scanning direction, and are designed to prevent a positional shift of a scanning line due to an optical face tangle error of the polygon mirror. When a vibrating mirror is used as the deflector 13, since there is only one reflecting surface, it is unnecessary to use any optical system for preventing a positional shift of a scanning line due to an optical face tangle error, as long as initial adjustment is accurately done. When the photosensitive member 18 is to be scanned with a light beam modulated with an image signal, an f-θ lens is sometimes used as an optical system for keeping the scanning speed on the photosensitive member 18 constant.

The light beam focused by the scanning lenses 15a and 15b is partly or entirely reflected by the return mirror 24 located on a scanning line incomes on the BD sensor (beam detect sensor) 25 as an example of a photodetection unit. A horizontal sync signal (BD signal) as a write reference in the main scanning direction is generated at the timing when the BD sensor 25 detects a light beam. The image processing unit outputs a one-line image signal with reference to this horizontal sync signal. The light beam reflected by the return mirror 24 is also focused on the beam convergence sensor 26. As a consequence, the convergence of the light beam is detected. As described above, the convergence of a light beam is measured from the spot size of the light beam at a specific detection point (detection position), e.g., on the beam convergence sensor 26. A correction unit 52 receives a detection signal from the beam convergence sensor 26 and determines a beam waist position.

It is preferable that a light beam is applied to the photosensitive member 18 so that it is focused most on the surface of the photosensitive member 18 in all operating environmental conditions. That is, applying a light beam to the photosensitive member 18 so as to make the beam waist, which is the position where the light beam is focused most, coincide with the surface of the photosensitive member 18 is a condition for forming an electrostatic latent image on the photosensitive member 18 with high accuracy. This leads to maintaining the print quality of an electrophotograph without degrading the image quality in the application of the optical scanning apparatus to a printer or a copying machine.

An input unit 61 outputs a beam waist position for each image height (i.e., position in the scanning direction) in the scanning line at the time of initial assembly (to be described later) to the correction unit 52. The input unit 61 is, for example, a bar code reader which reads a bar code and inputs data or an operation unit which is operated by the user to input various kinds of data. The operator inputs a beam waist position for each image height in the scanning line or its index value at the time of initial assembly through the input unit 61. It is preferable that every input value is stored and used as needed. Alternatively, it suffices to store a beam waist position for each image height in the scanning line or its index value at the time of initial assembly in a storage medium such as an EEPROM in advance. For example, as a beam waist position for each image height in the scanning line or its index value at the time of initial assembly, a value measured at the time of manufacture is used.

The correction unit 52 generates a BD mask signal 301 in synchronism with a BD signal 201 input from the BD sensor 25, and outputs the BD mask signal 301 to the laser driving control unit 54. The correction unit 52 also outputs beam waist position data 203 corresponding to the scanning position of a light beam (an image height in the scanning line) on the photosensitive member 18 to a control power supply 32. Note that the beam waist position data 203 is data as an index value indicating a beam waist position and corresponds to displacement information (to be described later). Displacement information is a row of focal positions of light beams in the optical system of the optical scanning apparatus. A memory 31 stores displacement information measured in advance.

A laser driving control unit 54 controls the current value and driving time of a driving (emission) signal 204 for the semiconductor laser 1 on the basis of an image signal 202 input from an image signal generating unit 53 in an image interval during which a latent image is formed on the photosensitive member 18.

The control power supply 32 applies an electrical signal corresponding to the beam waist position to electrodes 6 to 8 to apply a voltage corresponding to the input beam waist position data 203 (displacement information) to the collimating lens 5. Note that beam waist position data indicating a beam waist position is sometimes simply called a beam waist position. This data is data for correcting a beam waist position to make it coincide with the surface of the photosensitive member 18, and hence is sometimes called correction data or a correction value. An electrical signal changes in accordance with the scanning position of a light beam, and hence the BD signal 201 and a pixel clock are respectively input from the correction unit 52 and the image signal generating unit 53 to the control power supply 32 in order to synchronize a scanning signal with a signal to be applied. Note that the control power supply 32 preferably interpolates a beam waist position by linear interpolation or the like at a position other than a sample scanning position where a beam waist position is measured, in accordance with control by itself or by a correction unit 21.

In this manner, the light beam emitted from the semiconductor laser 1 is converted into almost parallel light by the collimating lens 5 and the optical aperture 10 and then becomes incident on the rotating polygon mirror 13 with a predetermined beam diameter. Note that an image height is a position on the photosensitive member in the main scanning direction, and expresses a position with respect to an end portion along the main scanning direction by a negative or positive value with the middle of the photosensitive member being 0. In this embodiment, the image height is also referred to as a scanning position.

<Collimating Lens>

FIG. 2 is a perspective view of the collimating lens 5 which is a characteristic feature of the present invention according to this embodiment. The collimating lens 5 is formed by an electro-optics crystal, and is configured to be able to change the focal length in accordance with the voltage to be applied to the electrodes provided inside the collimating lens 5 and on its side surfaces. The collimating lens 5 has a quadratic prism-like main body 5a and a spherical portion 5b placed on the distal end side of the main body 5a (on the optical aperture 10 side). The collimating lens 5 is formed by an electro-optics crystal such as a KTN crystal. A KTN crystal can be handled in the same manner as general optical glass, and has good workability, thereby allowing to easily ensure high surface accuracy in a cutting and polishing processes. The transmittance of a light beam through the KTN crystal is an internal transmittance of 95% or more per m throughout the infrared range to the visible light range as the wavelength range of the laser. This crystal also has small birefringence. The water absorption of the KTN crystal is equal to or less than that of glass, and is much smaller than that of a resin or the like. It is also known that the internal refractive index of the KTN crystal changes when an electric field is applied inside the crystal. It is known that when electrodes are placed across two ends of the KTN crystal (voltage=V and voltage=0 are respectively applied to the electrodes) and an electric field is generated inside the crystal, as the electric field has a graded distribution inside the crystal, the refractive index also has a graded distribution due to its influence, and light propagates while changing its direction.

This embodiment is configured to change the focusing characteristic of a light beam at the time of transmission through the crystal by using this phenomenon. The electrodes of the collimating lens 5 formed by the KTN crystal, which is a characteristic feature of the embodiment, are integrally arranged inside the collimating lens 5 and on its external portions (the side surfaces in this example). More specifically, as shown in FIGS. 1 and 2, the plate-like external electrodes 6 and 8 are arranged on the two opposing side surfaces of the quadratic prism-like main body 5a of the collimating lens 5, and the plate-like internal electrode 7 is placed inside the main body 5a to be parallel to the external electrodes 6 and 8. An electric field is generated by applying a voltage to the internal electrode 7 and the external electrodes 6 and 8 to change the refractive index of a light beam transmitted through the collimating lens. It is preferable that a common electrical signal is applied to the external electrodes 6 and 8. This is because the internal electric field distribution in the KTN crystal becomes symmetric with respect to the internal electrode 7 as a symmetry plane.

Note that the direction in which the focusing characteristic of a light beam is changed coincides with the direction between the external electrodes 6 and 8 and the internal electrode 7, and the arrangement of the plate electrodes shown in FIGS. 1 and 2 allows changing only the focusing characteristic of a light beam in the main scanning direction. In this case, of light beams emitted as linearly polarized light beams, the direction of the electric vector of a linearly polarized light beam should coincide with the direction of the electric field generated inside the crystal, and changes in them will cause a change in the focusing characteristic of a light beam. This makes it possible to change the focusing characteristic of a light beam on the photosensitive member 18 and focus the light beam at a desired position by only changing the focusing characteristic of a light beam by using the collimating lens 5 formed by the KTN crystal.

Note that the shape of the collimating lens is not specifically limited. For example, as shown in FIG. 3, it suffices to use a collimating lens 50 having spherical portions 50b placed on the two sides of a cylindrical main body 50a in the axial direction. In this case, an internal electrode 16 placed in the central portion of the collimating lens 50 is a bar electrode, and external electrodes 17a and 17b placed on the outer surface of the main body 50a are plate electrodes. Two pairs of external electrodes 17a and 17b are arranged on the main body 50a so as to face each other in the radial direction. An electric field is generated by applying a voltage to the internal electrode 16 and the external electrodes 17a and 17b, thereby changing the refractive index of a light beam transmitted through the collimating lens.

When the focusing characteristic of a light beam in the sub scanning direction is to be changed, the plate electrodes 6, 7, and 8 may be arranged to be horizontal (with a phase shift of 90°) to the drawing surface instead of being perpendicular to it so as to make the direction of the electric vector of a light beam become parallel in FIG. 1. In this case, however, a focusing effect on the sub scanning side is produced on the deflector 13 which is a polygon mirror, and the deflector 13 and the photosensitive member 18 have a conjugate relationship to keep correcting the optical face tangle error. Therefore, changing the focusing characteristic of a light beam in the sub scanning direction will execute the effect of keeping correcting the optical face tangle error and the effect of changing the focusing characteristic of a light beam on the photosensitive member 18 in the sub scanning direction. In practice, therefore, it is necessary to give consideration to both the effects, and it suffices to use the effects while giving priorities in consideration of purposes and importance.

In actual operation in the optical scanning apparatus, it is determined in accordance with a measurement result on the spot size of a light beam on the photosensitive member 18 whether a focus shift (beam waist position shift) has occurred. In this case, if the spot size is relatively large and a sufficient write depth is set, very large electrical signals need not always be applied to the electrodes of the KTN crystal. In this manner, it suffices to apply electrical signals to the electrodes when the temperature reaches a predetermined threshold as in a case wherein a temperature change is large, with almost no focus correcting effect by applying electrical signals under normal conditions. This makes it possible to prevent unnecessary consumption of electric energy.

The beam convergence sensor 26 will be described next. This embodiment can exemplify, as the beam convergence sensor 26, an arrangement in which slit-like apertures are arranged in front of a photodiode as a photosensor. When a light beam passes through the apertures, the amplitude of an output signal from the photodiode changes depending on the magnitude of a spot size. As the spot size decreases, the amplitude increases. Using the beam convergence sensor 26 makes it easy to recognize a beam waist position.

There is a case wherein the spot size of a light beam on the photosensitive member 18 is relatively small, and consideration is given to the magnitude of a spot size within one scanning line in order to obtain a high-quality image. In this case, it is possible to change the focal position of a light beam on the photosensitive member 18 little by little by quickly changing an electrical signal to the electrodes of the collimating lens 5 formed by a KTN crystal on the basis of a synchronization detection signal with respect to scanning. This embodiment will exemplify the case wherein control is performed to change the focal position of a light beam on the photosensitive member 18 little by little within a scanning line as in the latter case. Control in the former case is the same as control in the latter case in terms of the present invention. Note that as a synchronization detection signal, for example, a horizontal synchronization signal generated on the basis of a BD signal or a pixel clock as a sync signal for image data is used.

The focusing characteristic of the collimating lens 5 formed by a KTN crystal can be changed within a short period of time because the response speed of the KTN crystal is high. Therefore, first of all, curvature of fields corresponding to positions in the scanning direction as sample points, which change due the influences of the optical system including the scanning lenses 15*a* and 15*b* and the like, are acquired in advance by using a jig or the like at the time of assembly, and are stored in the memory 31 of the correction unit 52 in advance. A curvature of field is represented by displacement information indicating a focal position shift at each position of the photosensitive member with reference to a focal position at a given reference position. Displacement information is obtained by detecting a beam waist position where the spot size is minimized as a sensor placed at a sampling position is moved in a direction perpendicular to the surface of the photosensitive member in a state wherein the voltage applied to the collimating lens 5 is 0 at the time of, for example, the manufacture of the apparatus. In this case, a beam waist position itself can be detected. The memory 31 stores the displacement information generated by this method.

It is also possible to determine a beam waist position by measuring the spot size of a light beam by using the beam convergence sensor provided at a position corresponding to the surface of the photosensitive member while changing the focal length by changing the voltage applied to the collimating lens 5. In this method, an applied voltage value by which the spot size measured at a given scanning position (a position in the scanning direction) is minimized is a voltage value (i.e., a correction value) for moving the beam waist position at the scanning position to the surface of the photosensitive member. Therefore, this correction value at each sample point at which displacement information is measured may be the above displacement information itself. In this embodiment, however, a correction value representing the voltage applied to the collimating lens is temporarily converted into the distance between the surface of the photosensitive member 18 to the beam waist position and stored in the memory 31. This is because the relationship between the voltage applied to the collimating lens 5 and the focal length of the collimating lens 5 is not always linear. If this relationship is linear or can be regarded as linear, storing a correction value as displacement information itself will help simplify the processing. Note that a correction value at the position of the beam convergence sensor 26 will be specifically referred to as a reference value in this embodiment.

Note that a focusing characteristic is sometimes expressed by another term such as a beam waist position, focus, or focal length in this embodiment. However, these terms essentially represent the same as long as this embodiment is concerned.

The voltage applied to the electrodes of the collimating lens 5 is controlled to correct a focus shift in accordance with a scanning position on the photosensitive member and the displacement information in synchronism with the BD signal 201 output from the BD sensor 25 and a pixel clock (not shown). This makes it possible to perform fine focusing in the entire scanning range. If displacement information represents a beam waist position, the voltage to be applied to the electrodes of the collimating lens 5 so as to move the beam waist position to the surface of the photosensitive member 18 is obtained on the basis of the beam waist position. The obtained voltage is then applied to the electrodes of the collimating lens 5. The voltage is then changed in accordance with a scanning position in one scanning line, and the curvature of field is corrected, thereby correcting the beam waist position on a straight line on the photosensitive member 18.

<Focus Adjusting Operation>

Figure 4:
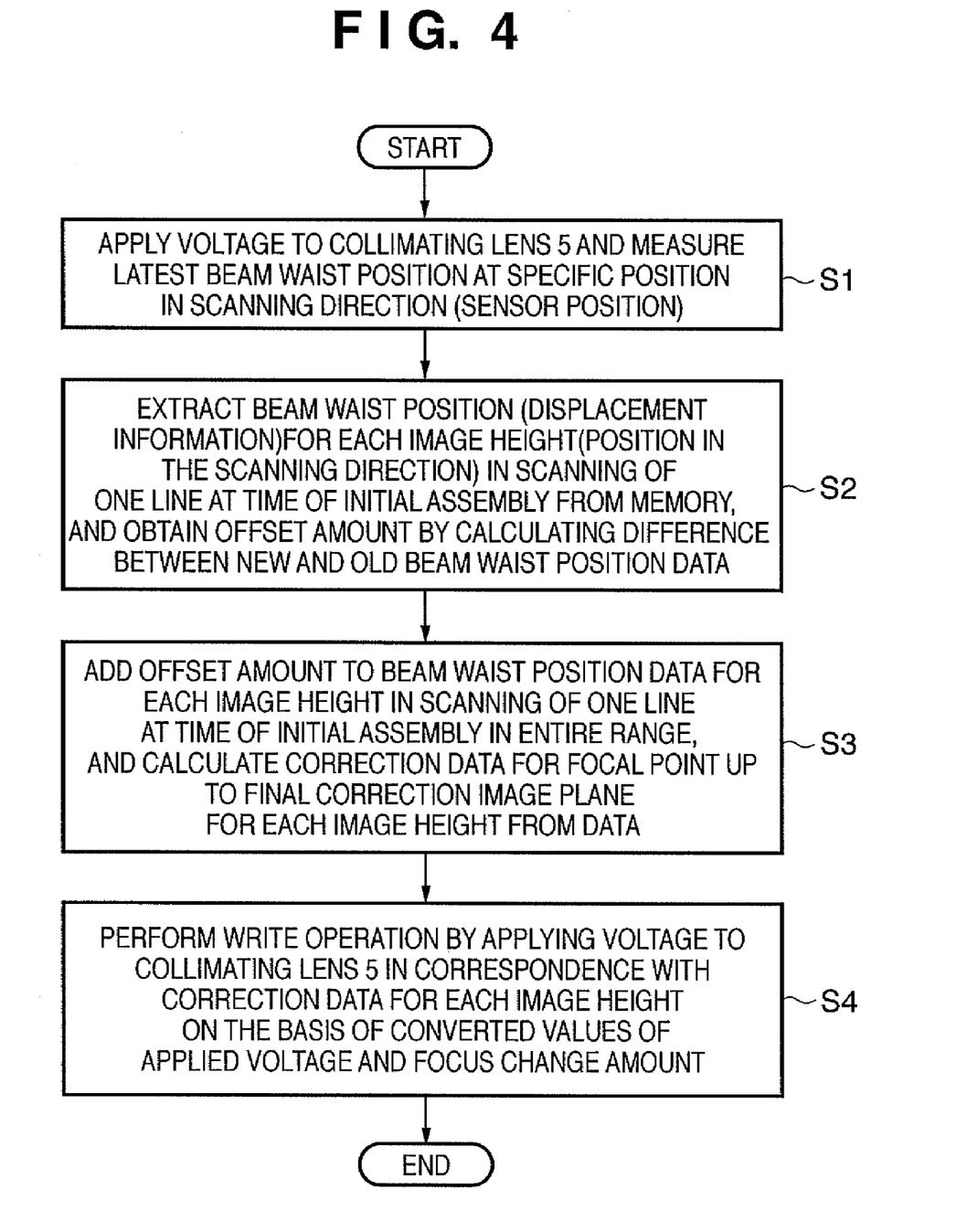
FIG. 4 is a flowchart for explaining focus adjusting operation.
Figure 5:
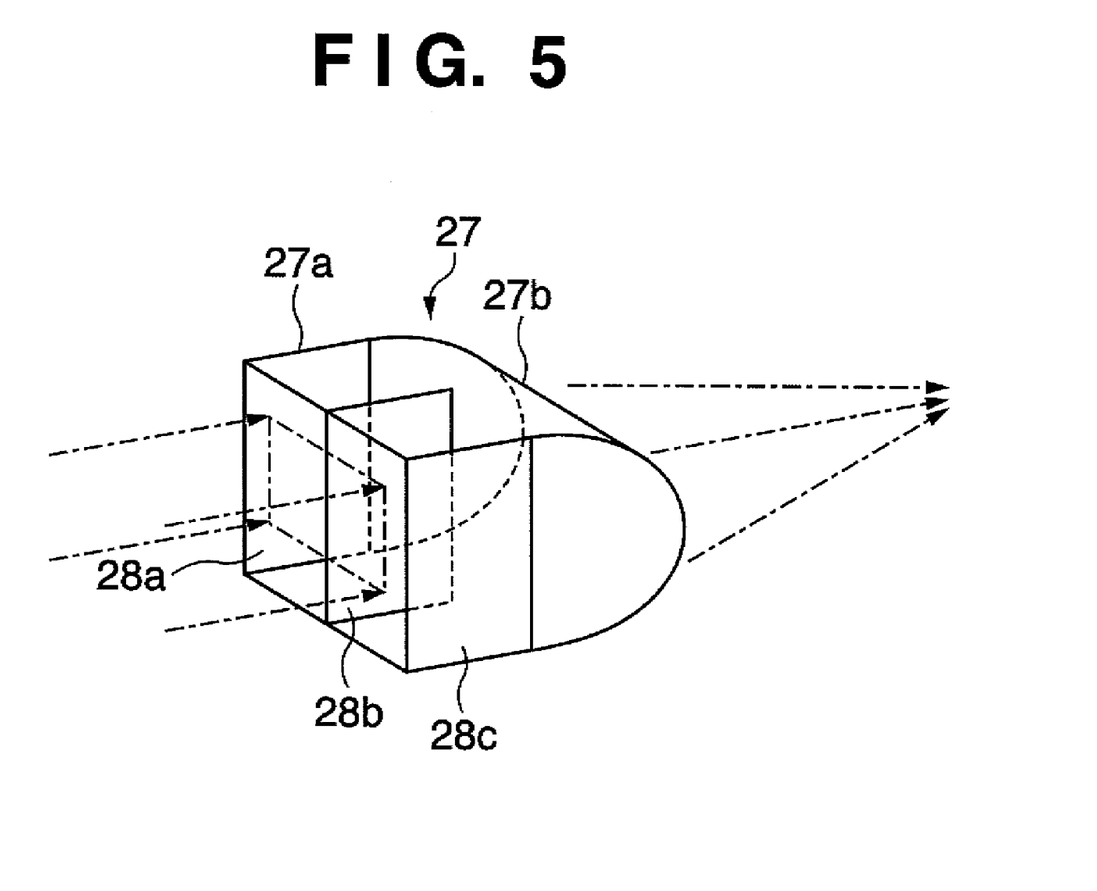
FIG. 5 is a perspective view for explaining an optical scanning apparatus according to the second embodiment of the present invention.

Focus adjusting operation will be described in detail next with reference to FIGS. 1 to 4. FIG. 4 is a flowchart for explaining focus adjusting operation. This flowchart is executed by a processor incorporated in the correction unit 52 or the like.

Referring to FIG. 4, first of all, a search is made for a position where the output signal amplitude of the beam convergence sensor 26 is maximized (i.e., a beam waist position where the spot size is minimized) as a focal position. For this purpose, the optical scanning apparatus checks a focus state before scanning on the photosensitive member 18. That is, before the photosensitive member 18 is exposed, laser beams are scanned on the BD sensor 25 and the beam convergence sensor 26, and control is performed to change the voltage applied to the electrodes 6, 7, and 8 of the collimating lens 5 stepwise for each scanning operation, thereby changing the focal position. With this operation, the current beam waist position is measured at a specific image height (the position of the beam convergence sensor 26 in this example) at the current point of time. More specifically, the voltage applied to the electrodes 6, 7, and 8 at the time when an output signal amplitude from the beam convergence sensor 26 is maximized is converted to a value indicating a beam waist position. This value is determined from an output from the beam convergence sensor 26 (step S1). For this purpose, a table indicating the correspondence between the voltages applied to the electrodes of the collimating lens 5 and changes in focal length is generated in advance. The memory 31 or the like stores this table in advance at the time of manufacture of an apparatus. To implement step S1, the beam convergence sensor 26 is placed at a position corresponding to the surface of the photosensitive member when the photosensitive member 18 is extended in the main scanning direction. When the return mirror 24 is to be used, the mirror is provided at a position equal in distance on an optical path to a position corresponding to the surface of the extended photosensitive member.

Displacement information, i.e., beam waist position data (a plurality of positions in the scanning direction) in scanning of one line which is acquired at the time of assembly/adjustment of an optical scanning apparatus is extracted from the memory of the correction unit 52. This apparatus then calculates the difference between a beam waist position corresponding to a specific image height (i.e., a beam convergence sensor position) checked in step S1, which is included in the extracted beam waist position data, and the beam waist position measured in step S1. This difference is set as an offset value (offset amount). The calculated offset value is temporarily stored (step S2).

Note that the memory 31 stores beam waist position data (displacement information) in scanning of one line (a plurality of positions in the scanning direction) which are acquired as displacement information at the time of assembly/adjustment of an optical scanning apparatus. These data are calculated by measuring beam diameters for the respective positions in the scanning direction and the respective depths of scanning beams and interpolating data from the measurement results. The displacement originates from only the optical system (arrangement system). This data is acquired by an assembly adjustment jig, as described above.

Adding the offset value stored in the memory 31 to beam waist position data at each scanning position (a plurality of positions in the scanning direction) in scanning of one line described above will generate new displacement information after correction. That is the new displacement information after correction is the latest value of a beam waist position in one line in an electrophotographic apparatus. This data will be referred to as corrected data (step S3). This corrected data, i.e., the displacement information after correction, is stored and overwritten on displacement information before correction. It suffices to separately store displacement information before correction and an offset value.

In step S4, displacement information is converted into a voltage to be applied to the collimating lens at each scanning position. The beam waist position can be made to coincide with a photosensitive surface throughout the entire scanning range on the photosensitive member. If displacement information is an index value indicating a beam waist position shift, it is necessary to convert the index value into a voltage to be applied to the collimating lens. In this case, the correspondence relationship between voltages applied to the electrodes 6, 7, and 8 of the collimating lens 5 and focus change amounts near the position of the surface of the photosensitive member is measured in advance, and a table representing the relationship is generated in advance. An applied voltage corresponding to the above correction data for each image height (displacement information after correction) is actually applied to the collimating lens 5 to actually perform image forming operation (the applied voltage changes for each image height) (step S4). As described above, when an image is to be formed, an applied voltage after correction is applied to the electrodes of the collimating lens.

Note that all these processes are performed within the electrophotographic apparatus. When image data is to be written on the photosensitive member 18 by exposure, almost optimal spots can be made uniform in the entire surface of the photosensitive member 18 with reference to a signal from the BD sensor 25.

Figure 7:
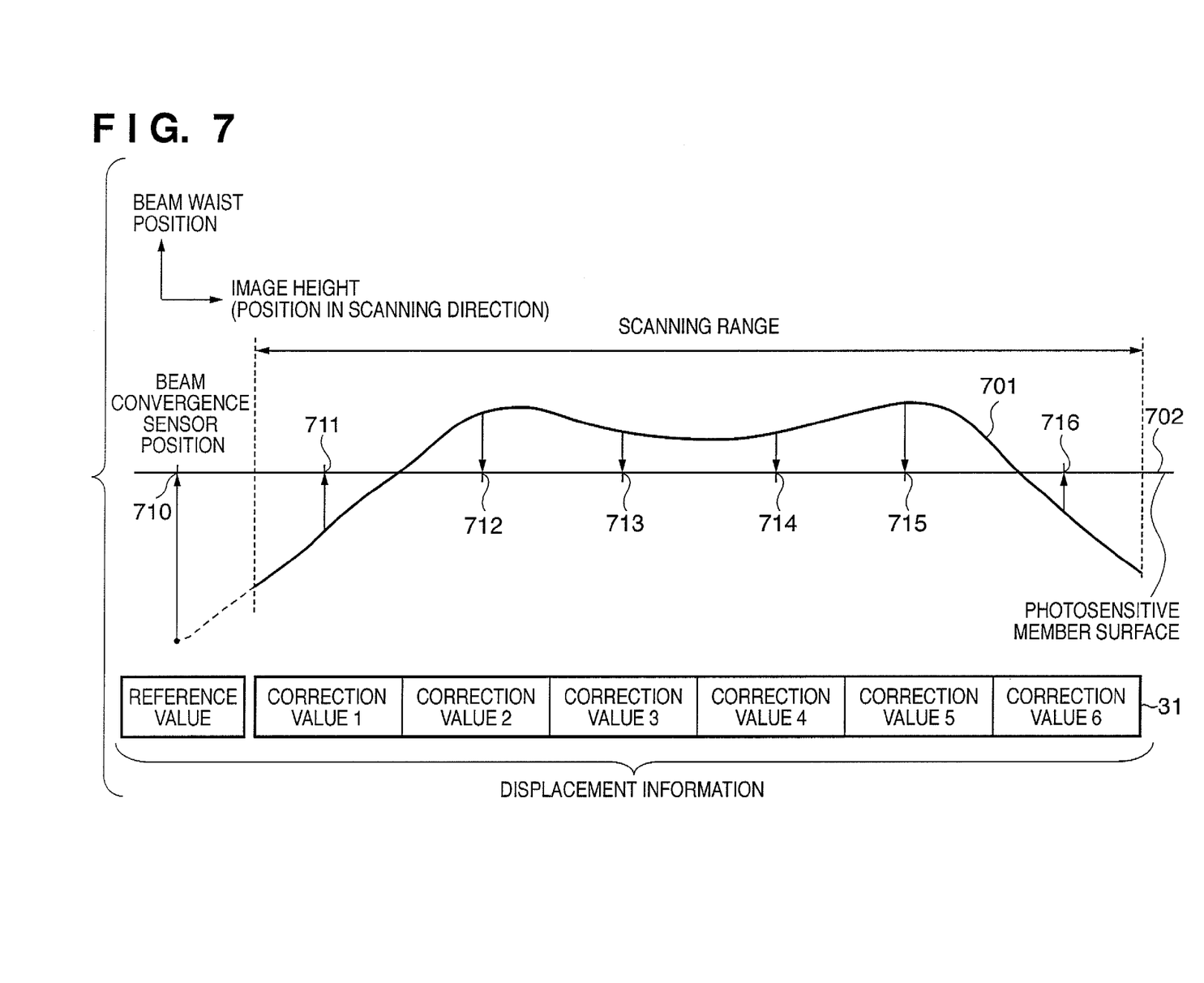
FIG. 7 is a schematic view showing how a beam waist position is corrected by the optical scanning apparatus according to the embodiment.
Figure 8:
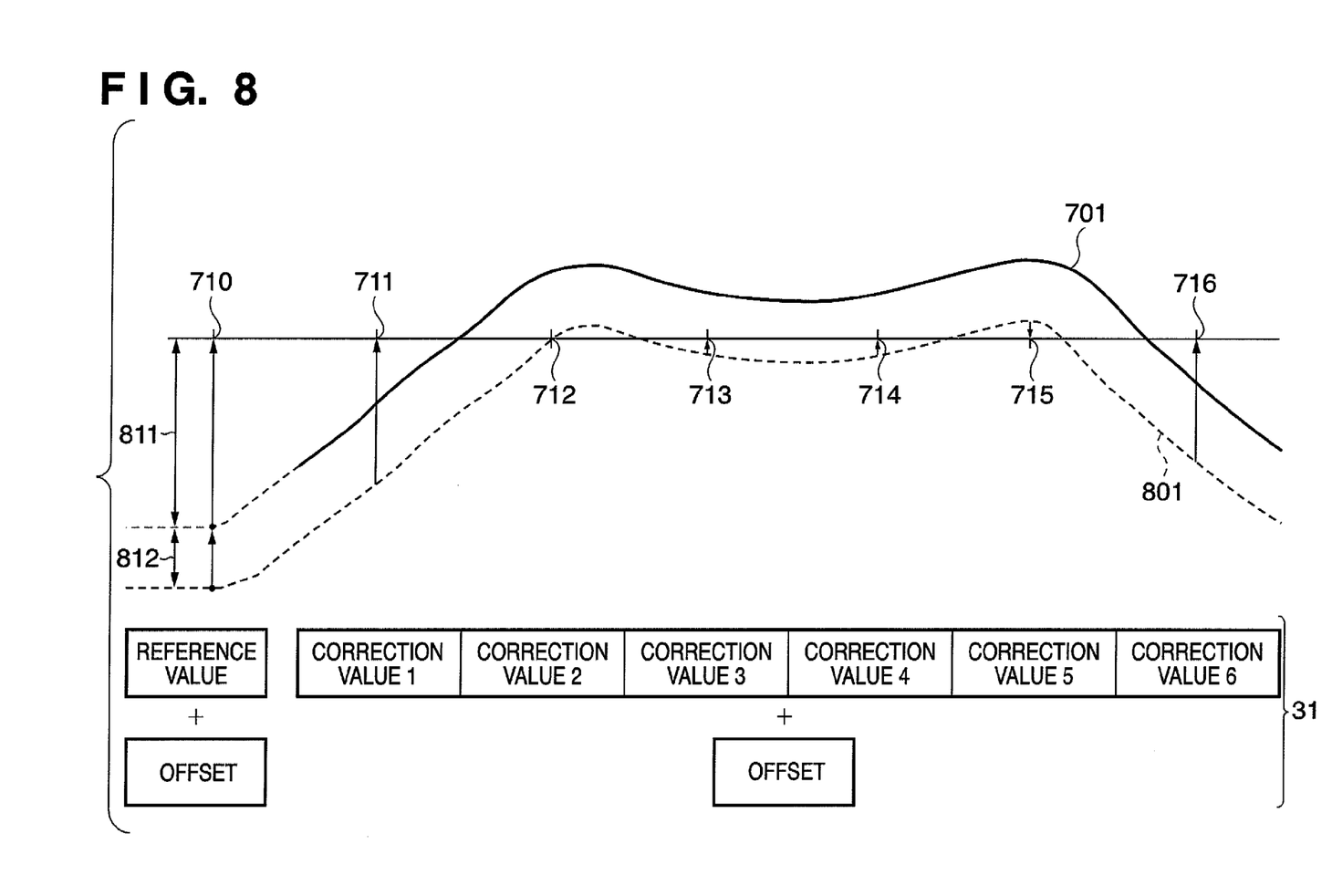
FIG. 8 is a schematic view showing how a correction value for a beam waist position is further corrected by the optical scanning apparatus according to the embodiment.

FIGS. 7 and 8 are schematic views for correction in this embodiment. FIG. 7 is a schematic view showing a locus 701 of the beam waist position of a light beam scanned on a photosensitive member surface 702. Displacement information is information indicating the locus 701. Referring to FIG. 7, the upper portion is the outside of the photosensitive member 18, and the lower portion is the inside of the photosensitive member 18. Since a light beam is not transmitted through the photosensitive member 18, the locus 701 inside the photosensitive member 18 indicates a row of positions where a light beam should be focused without the photosensitive member 18 instead of the positions where the light beam is actually focused. As in the case shown in FIG. 7, there are only limited scanning positions where beam waist positions are located on the surface of the photosensitive member 18, so the beam waist positions shift back and forth from the surface of the photosensitive member in almost the entire scanning range. For this reason, at the time of manufacture of an optical scanning apparatus according to this embodiment, e.g., a copying machine, beam waist position shifts at the position of the surface of the photosensitive member 18 are measured in advance and corresponding displacement information is determined in advance. Measurement is performed at sampling positions 711 to 716 and a beam convergence sensor position 710 on the surface of the photosensitive member 18. In focus shift correction, a voltage which minimizes the spot diameter of a light beam is obtained as a correction value by changing the voltage applied to the collimating lens 5. Correction values including correction values 1 to 6 are stored as displacement information in correspondence with the respective sampling points, and also stored in the memory 31 as reference values in association with the beam convergence sensor position 710. In scanning operation using a light beam, a correction value stored in the memory 31 is read out in synchronism with a main scanning position, and a voltage corresponding to the correction value is applied to the electrodes of the collimating lens 5. When linear interpolation for a correction value is to be performed, since correction values at two sampling points on the two sides of a given scanning position are required, two correction values on the two sides of the scanning position are read in synchronism with main scanning, and correction is performed. As a result, beam waist positions are located on almost the surface of the photosensitive member 18 throughout one main scanning operation.

FIG. 8 is a view showing how correction values obtained in the manner shown in FIG. 7 are further corrected. Even the correction values obtained at the time of manufacture of the apparatus as shown in FIG. 7 may become inappropriate with the lapse of time. For this reason, correction values themselves must be corrected as needed, for example, at predetermined time intervals. A locus 801 represented by the dotted line in FIG. 8 indicates the locus of beam waist positions shifted due to changes with time. That is, correction data for displacement information obtained by the procedure in FIG. 4 should represent the locus 801. In this case, at the beam convergence sensor position 710, the voltage to be applied to the collimating lens 5 is changed to apply, to the collimating lens, a voltage which minimizes the spot diameter of a light beam on the surface of the photosensitive member 18. As a result of the correction, since the locus 701 of the beam waist positions has been shifted to the locus 801 of the beam waist positions with the lapse of time, the beam waist positions which have been corrected to the positions shifted from the surface of the photosensitive member 18 are corrected to be located on the surface of the photosensitive member 18.

As described above, in this embodiment, applying a voltage to the external electrodes 6 and 8 and the internal electrode 7 of the collimating lens 5 formed by a KTN crystal makes it possible to quickly change the focusing characteristic of a light beam transmitted through the collimating lens 5 between the respective electrodes. This can quickly displace the focusing position of a light beam which is deflected and scanned, thereby achieving an improvement in accuracy at the focusing position of a light beam in the entire scanning range. As a consequence, the write quality on the surface of the photosensitive member 18 to be scanned can be improved.

In addition, since the collimating lens 5 itself is formed by a KTN crystal, there is no need to add any new components as in the prior art. This can decrease the number of components required and reduce the size and cost of the apparatus.

Furthermore, since only one beam convergence sensor 26 is required, the number of components required can be decreased and the processing procedure can be simplified accordingly.

[Modification]

Note that it is also possible to measure, as displacement information, an applied voltage at which a light beam is focused at a sensor position while the beam waist position is moved by the beam convergence sensor placed at a position corresponding to the surface of the photosensitive member by changing the voltage to be applied to the electrodes of the collimating lens 5. In this case, displacement information represents a voltage itself to be applied to the collimating lens to move the beam waist position to the surface of the photosensitive member at a sampling position. Therefore, reading out displacement information and applying a voltage corresponding to a scanning position in main scanning to the collimating lens can correct a beam waist position.

SECOND EMBODIMENT

Figure 6:
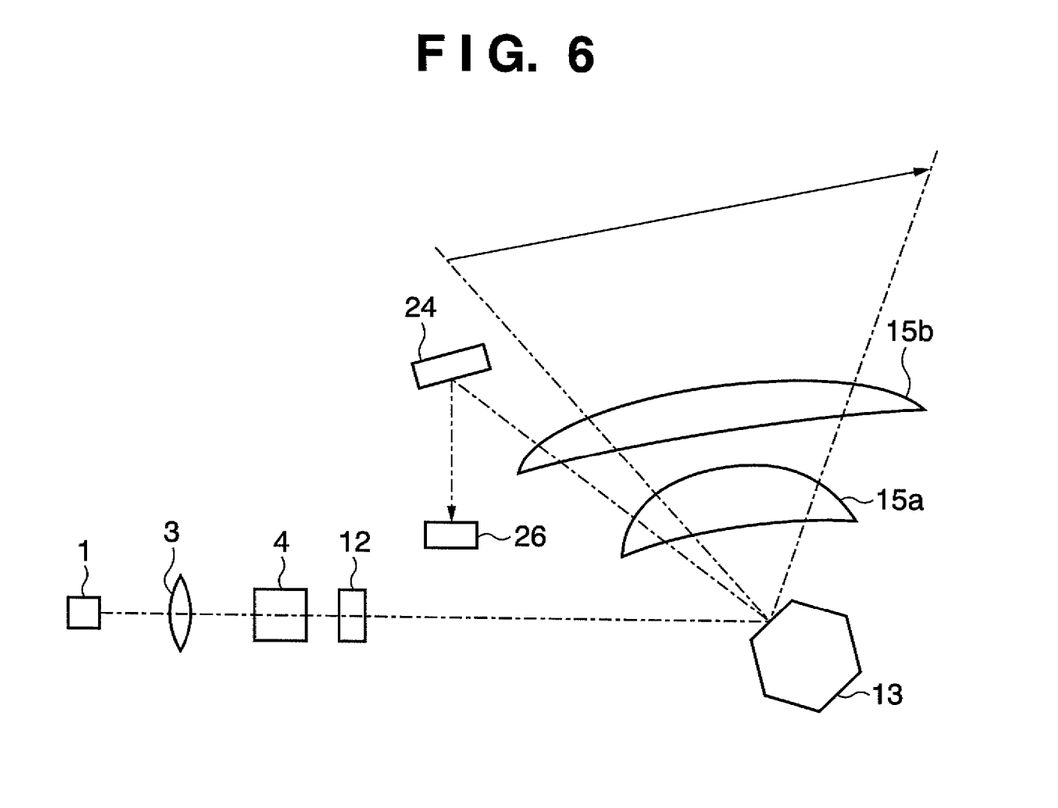
FIG. 6 is a view for explaining a conventional optical scanning apparatus.

An optical scanning apparatus according to the second embodiment of the present invention will be described next with reference to FIG. 6. Note that a repetitive description of the first embodiment will be omitted. The optical scanning apparatus according to the second embodiment of the present invention uses a cylindrical lens 27 in FIG. 6 instead of the cylindrical lens 12 in FIG. 1. In addition, unlike in the first embodiment described above, in the second embodiment, the cylindrical lens 27, instead of the collimating lens 5, is formed by a KTN crystal.

The cylindrical lens 27 has a quadratic prism-like main body 27a and a convex curve portion 27b placed on the distal end side of the main body 27a (on the optical aperture 10 side). Plate-like external electrodes 28a and 28c are placed on two opposing surfaces of the quadratic prism-like main body 27a of the cylindrical lens 27, and a plate-like internal electrode 28b is placed in the main body 27a to be parallel to the external electrodes 28a and 28c. An electric field is generated by applying a voltage to the internal electrode 28b and the external electrodes 28a and 28c to change the refractive index of a light beam transmitted through the cylindrical lens. Other arrangements and functions/effects are the same as those in the first embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-355158, filed on Dec. 28, 2006, and Japanese Patent Application No. 2007-291332, filed on Nov. 8, 2007, which are hereby incorporated by reference herein in their entirety.

What is claimed is:

1. An optical scanning apparatus comprising:
a collimating lens which parallelizes a light beam from a light source, wherein said collimating lens is formed by an electro-optics crystal, and is configured to change a focal length by applying an electrical signal to the electro-optics crystal through electrodes placed inside said collimating lens and on side surfaces thereof;
a detection unit which detects a focusing characteristic of a light beam on a surface to be scanned; and
a control unit which controls a voltage of an electrical signal applied to the electrodes on the basis of a detection signal obtained by said detection unit.

2. The apparatus according to claim 1, wherein the electro-optics crystal is a KTN (potassium tantalate niobate) crystal.

3. The apparatus according to claim 1, wherein the electrodes placed on the side surfaces are plate electrodes, and the electrode placed in the inside is a bar electrode.

4. The apparatus according to claim 1, wherein said control unit changes an electrical signal to be applied to the electrodes on the basis of a synchronization detection signal with respect to scanning.

5. The apparatus according to claim 1, wherein the electrodes are arranged to change the focusing characteristic of the light beam in at least one of a main scanning direction and a sub scanning direction.

6. The apparatus according to claim 1, further comprising a storage unit which stores data representing a focal position distribution corresponding to scanning positions in one scanning operation by the scanning light and a focal position of the scanning light at the detection point in a state in which no voltage is applied to the electrodes,
wherein said detection unit detects a spot size of scanning light transmitted through said collimating lens or said cylindrical lens at a predetermined detection position,
said control unit determines an applied voltage at which a spot size of scanning light transmitted through said collimating lens or said cylindrical lens at the detection position is minimized by changing an applied voltage to the electrodes, determines a current focal position of scanning light at the detection point in a state in which no voltage is applied to the electrodes, on the basis of the applied voltage, and corrects the focal position distribution by adding a difference between the focal position and a focal position stored in said storage unit to each focal position included in the focal position distribution stored in said storage unit, and
a lens control unit which moves a focal position of a light beam to a photosensitive member surface by applying a voltage based on the focal position distribution corrected by said correction unit.

7. An optical scanning apparatus comprising:
a cylindrical lens which guides a light beam to become incident on a deflector, wherein said cylindrical lens is formed by an electro-optics crystal, and is configured to change a focal length by applying an electrical signal to the electro-optics crystal through electrodes placed inside said cylindrical lens and on side surfaces thereof;
a detection unit which detects a focusing characteristic of a light beam on a surface to be scanned; and
a control unit which controls a voltage of an electrical signal applied to the electrodes on the basis of a detection signal obtained by said detection unit.

8. The apparatus according to claim 7, wherein the electro-optics crystal is a KTN (potassium tantalate niobate) crystal.

9. The apparatus according to claim 7, wherein the electrodes placed on the side surfaces are plate electrodes, and the electrode placed in the inside is a bar electrode.

10. The apparatus according to claim 7, wherein said control unit changes an electrical signal to be applied to the electrodes on the basis of a synchronization detection signal with respect to scanning.

11. The apparatus according to claim 7, wherein the electrodes are arranged to change the focusing characteristic of the light beam in at least one of a main scanning direction and a sub scanning direction.

12. The apparatus according to claim 7, further comprising a storage unit which stores data representing a focal position distribution corresponding to scanning positions in one scanning operation by the scanning light and a focal position of the scanning light at the detection point in a state in which no voltage is applied to the electrodes,
wherein said detection unit detects a spot size of scanning light transmitted through said collimating lens or said cylindrical lens at a predetermined detection position,
said control unit determines an applied voltage at which a spot size of scanning light transmitted through said collimating lens or said cylindrical lens at the detection position is minimized by changing an applied voltage to the electrodes, determines a current focal position of scanning light at the detection point in a state in which no voltage is applied to the electrodes, on the basis of the applied voltage, and corrects the focal position distribution by adding a difference between the focal position and a focal position stored in said storage unit to each focal position included in the focal position distribution stored in said storage unit, and
a lens control unit which moves a focal position of a light beam to a photosensitive member surface by applying a voltage based on the focal position distribution corrected by said correction unit.

* * * * *